United States Patent [19]

Panushka

[11] Patent Number: 4,584,898

[45] Date of Patent: Apr. 29, 1986

[54] SPRING-LOADED PUSH-PULL CABLE ASSEMBLY

[75] Inventor: Lawrence C. Panushka, Canoga Park, Calif.

[73] Assignee: Lockheed Corporation, Burbank, Calif.

[21] Appl. No.: 334,977

[22] Filed: Dec. 28, 1981

[51] Int. Cl.$^4$ .............................................. F16C 1/10
[52] U.S. Cl. ................................. 74/501.5 R; 74/502; 403/166
[58] Field of Search ................. 74/501.5 R, 502, 487, 74/501 R; 267/177; 188/196 M; 251/294; 403/166, 229

[56] References Cited

U.S. PATENT DOCUMENTS

| | | | |
|---|---|---|---|
| 213,400 | 3/1879 | Ditsworth | 403/166 X |
| 1,037,856 | 9/1912 | Blair | 403/166 X |
| 2,323,352 | 7/1943 | Pitts | 74/501 |
| 2,415,099 | 2/1947 | Hooper | 74/502 |
| 2,424,198 | 7/1947 | Tauscher | 74/501.5 R |
| 2,616,139 | 11/1952 | Von Wald, Jr. et al. | 24/126 |
| 2,675,714 | 4/1954 | Allard | 74/501.5 R |
| 2,744,420 | 5/1956 | Pigford | 74/501.5 |
| 2,787,916 | 4/1957 | Cushman | 74/501.5 |
| 2,814,210 | 11/1957 | Ford | 74/501.5 |
| 2,957,354 | 10/1960 | Morrow | 74/502 |
| 3,036,350 | 5/1962 | Hunt | 24/123 |
| 3,038,979 | 6/1962 | Yanikoski | 200/140 |
| 4,274,300 | 6/1981 | Golobay | 74/501.5 |

FOREIGN PATENT DOCUMENTS 824620 12/1959 United Kingdom .

Primary Examiner—James A. Leppink
Assistant Examiner—Frank H. McKenzie, Jr.
Attorney, Agent, or Firm—Louis L. Dachs

[57] ABSTRACT

An improved push-pull cable assembly (10) is provided with means for automatically compensating for changes in the cable's effective length, thus requiring a minimum of adjustment over an extended period. To this end, the cable's actuating rod (124) may be provided with a spring-loaded backlash compensating coupling (30) operatively connecting the actuating rod with an operating lever (106) on the controlled mechanism. A helical compression spring (198) is provided at the end of the push-pull cable assembly such that the spring exerts a compressive force in the longitudinal direction of the actuating rod between a spring retainer (196) and a clevis fitting (122) pivotally connected to the controlled mechanism's operating lever. The clevis fitting is slidably mounted with respect to the actuating rod such that the spring will tend to displace it from a compressed position (210) closer to the spring to an extended position (216) further away. The positions of both ends of the spring are adjusted with respect to the actuating rod such that the spring's compressive force will exceed the force required to operate the valve and also any backlash will be fully taken up and a continuing force applied to the lever when a handle (116) at the other end of the cable is fully pushed in.

5 Claims, 7 Drawing Figures

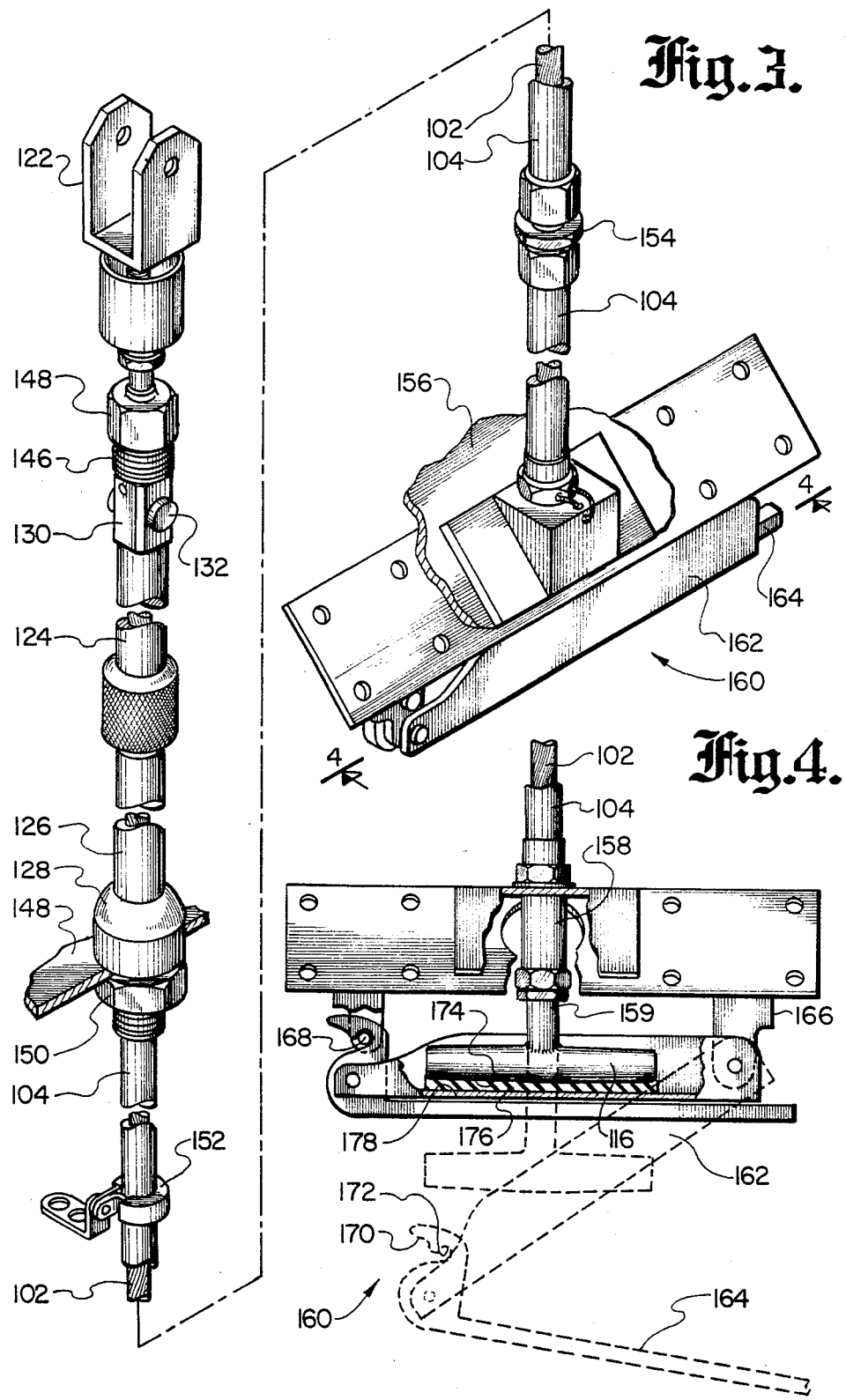

SPRING-LOADED PUSH-PULL CABLE ASSEMBLY

TECHNICAL FIELD

The present invention relates generally to mechanisms for transferring motive forces from a remote location and more particularly to an improved push-pull cable for remotely operating a valve or other similar mechanism.

BACKGROUND ART

Push-pull cable assemblies are well known in the prior art. They are conventionally used to control the operation of valves and other mechanisms from a conveniently located position remotely located from the actual mechanism being operated. For example, when designing a pressurized potable water supply for installation in large commercial passenger aircraft, it is desirable to keep the total length of the individual fluid conduits as short as possible in order to minimize weight. Furthermore, the shorter the fluid conduit, the less energy is required to pump the fluid through the system. Additionally, the probability of leaks occurring somewhere in the system will be diminished to the extent that the system can be reduced in size and capacity. As a result of such considerations, the several valves which are commonly required in such systems to seal off the portions of the system from one another or from the external environment are preferably located in the immediate vicinity of the fluid reservoirs and other plumbing subsystems with which they are functionally associated, rather than having their location determined solely by ease of access during normal operation and maintenance. Thus, it is desirable that it be possible to operate a control valve from a remote location by means of a simple, convenient and reliable mechanism for transferring motive forces. For such purposes, push-pull cable assemblies are commercially available having an operating handle at one end and an actuating rod at the other end connected by a flexible cable contained within a closely fitting sheath. Such as assembly can transmit both tensile and compressive forces from one end to the other. Because such a cable is designed to transmit compressive as well as tensile forces, it does not require the use of any return spring that would increase the force required to pull the cable to its retracted position and which would probably require the use of a brake or detent to prevent the cable from inadvertently returning to its unretracted position, thereby further increasing the operating force required. Since many valves and other mechanisms employ a conical or spherical member that must be rotated through an angle (typically 90°) from one position (e.g., "off") to another position (e.g., "on"), prior art push-pull cable assemblies have been provided with a swivel fitting at the actuating end which permits a swiveling movement of the actuating rod at the end of the cable so that the cable's outer sheath and its associated mountings are not subjected to bending moments as a lever arm operatively connected to the valve's rotating member moves in an arc about the valve's rotational axis and so that the end of the cable will always be able to exert its pushing and pulling motive forces in a straight line and thus will not become bent or kinked.

Typically, a push-pull cable such as described above will be so oriented with respect to the lever arm on the valve such that the "normal" (i.e., when the aircraft is airborne) position of the operating handle on the other end of the cable will be fully pushed-in (or "retracted") and its "alternative" (i.e., its condition during a refilling or draining operation) position will be with the handle pulled-out (or "extended"). Accordingly, to prevent the push-pull cable from being accidentally extended from its normal position to its alternative position, a keeper assembly may be operatively associated with the control handle for maintaining the handle in its retracted position, thereby insuring that it will not be moved to a partially extended position by gravity, vibration or other environmental forces.

With respect to such prior art push-pull cables, it will be appreciated that a certain amount of backlash is associated with their operation, since the fit between the outer surface of the flexible cable and the inner surface of the sheath must be sufficiently loose to prevent any binding even if the sheath is bent and accordingly, when the cable is pushed in, the inner walls of the sheath will tend to force the inner cable into a somewhat spiraled or undulating condition having an effective length shorter then the effective length of the pulled-out cable by an amount known as "backlash". Furthermore, as a result of normal use, the diametrical clearance between the cable and sheath will gradually increase, with the result that a worn push-pull cable will have even more backlash than a new push-pull cable.

When such a push-pull cable is being utilized to control a valve or other similar mechanism provided with a mechanical stop to define the valve's normal position, it will be appreciated that the effective length of the pushed-in cable must be precisely adjusted. When the cable's operating handle is fully retracted and held in place by the keeper assembly, the cable's actuating rod should press against the valve's lever arm so as to hold positively the valve against its stop, while taking up all the backlash between the cable and its sheath; however, there must not be any excessive forces that could distort the valve or its lever or which could subject the cable assembly and its mountings to excessive stresses. The known prior art cable assemblies accordingly provided a backlash adjustment (in the form of an adjustable threaded rod and locknut) which determines the effective overall length of the cable from its handle up to the point at which the cable pushes against the valve's lever arm.

It will be appreciated that such a prior art cable assembly was difficult to adjust since the backlash in the cable had to be determined by trial and error techniques, with one mechanic operating the handle and a second mechanic trying different positions of the threaded rod and locknut. If the adjustment were made too long, the various components would be overstressed and the weakest member would frequently be broken (for instance, the telescoping actuating rod at the end of the cable assembly). If the adjustment were made too short, the valve would be free to move away from its normal position, causing the aircraft's water supply to function erratically.

Accordingly, it is a primary objective of the present invention to provide an improved push-pull cable that may be readily adjusted to hold a valve or other similar mechanism in a predetermined normal position against a fixed stop when an operating handle at the other end of the cable is held in its normal pushed-in position by a keeper assembly.

It is a related objective to provide an improved push-pull cable that automatically compensates for changes in the cable's effective length caused by backlash, wear, etc.

It is yet another related objective to provide an improved push-pull cable having a spring operatively connecting the cable and the mechanism being operated to provide automatic compensation for backlash in the cable without requiring excessive operational forces or stresses.

It is an overall objective of the present invention to provide an improved push-pull cable assembly that will positively hold the controlled mechanism in a normal position, that will automatically take up for wear and backlash in the cable, that will prevent accidental overloading of the mechanism, that will remain in adjustment for an extended period of time, and that will be simple and can be adjusted accurately when such adjustment is required.

DISCLOSURE OF THE INVENTION

In accordance with the teachings of the present invention, a push-pull cable assembly having a handle at one end and an actuating rod at the other end is provided with means for automatically compensating for changes in the cable's effective length, thus requiring a minimum of adjustment over an extended period even when it is necessary that the cable be capable of positively holding the controlled mechanism at a predetermined "normal" position against a fixed stop. To this end, the cable's actuating rod may be provided with a spring-loaded backlash compensating coupling operatively connecting the actuating rod with an operating lever or other similar control means on the controlled mechanism.

In accordance with the presently preferred embodiment of the invention, such a spring-loaded backlash compensating coupling comprises a helical compression spring mounted about the actuating rod at the end of the push-pull cable assembly such that the spring exerts a compressive force in the longitudinal direction of the actuating rod between a spring cup or other retaining means attached to the actuating rod and a clevis fitting or other suitable connecting means pivotally connected to the control means of the mechanism being operated. The clevis fitting is slidably mounted to the actuating rod such that the spring will tend to displace the clevis fitting in the longitudinal direction of the rod from a compressed position closer to said spring cup to an extended position established by a clevis stop at the far end of the rod.

For ease of installation and maintenance, the actuating rod is preferably also provided with means for adjusting the portions of both the spring cup and of the clevis stop with respect to the actuating rod.

In normal use, the spring-loaded coupling is adjusted such that when the cable's handle is pushed fully home, the compression spring is partially compressed and the clevis fitting is at an intermediate position between its extended position and its compressed position, whereby providing a resultant over-travel clearance between the clevis fitting and the clevis stop. The lever or other control means of the controlled device is thus subjected to a continuing compressive force exerted by the compression spring which holds the device in its "normal" position as determined by a control stop provided as an integral part of the device. As soon as the handle is released from its fully pushed-in position, the compression spring is free to extend to its fully extended position by an amount determined by the over-travel clearance. As the dimensional clearance between the inner cable and the outer sheath increases with a resulting increase in the cable's backlash, the over-travel clearance between the clevis and the clevis stop decreases, until it becomes again necessary to re-adjust the mechanism after prolonged use.

BRIEF DESCRIPTION OF DRAWINGS

FIG. 3 is an isometric partially cutaway view showing a preferred embodiment of the push-pull cable of the present invention and, in particular, the fittings at both ends of the push-pull cable;

FIG. 4 is an elevational view of the handle end of the cable of FIG. 3 viewed from the side (as indicated by the arrows 4—4 in FIG. 3);

BEST MODE FOR CARRYING OUT THE INVENTION

Figures 1, 2:
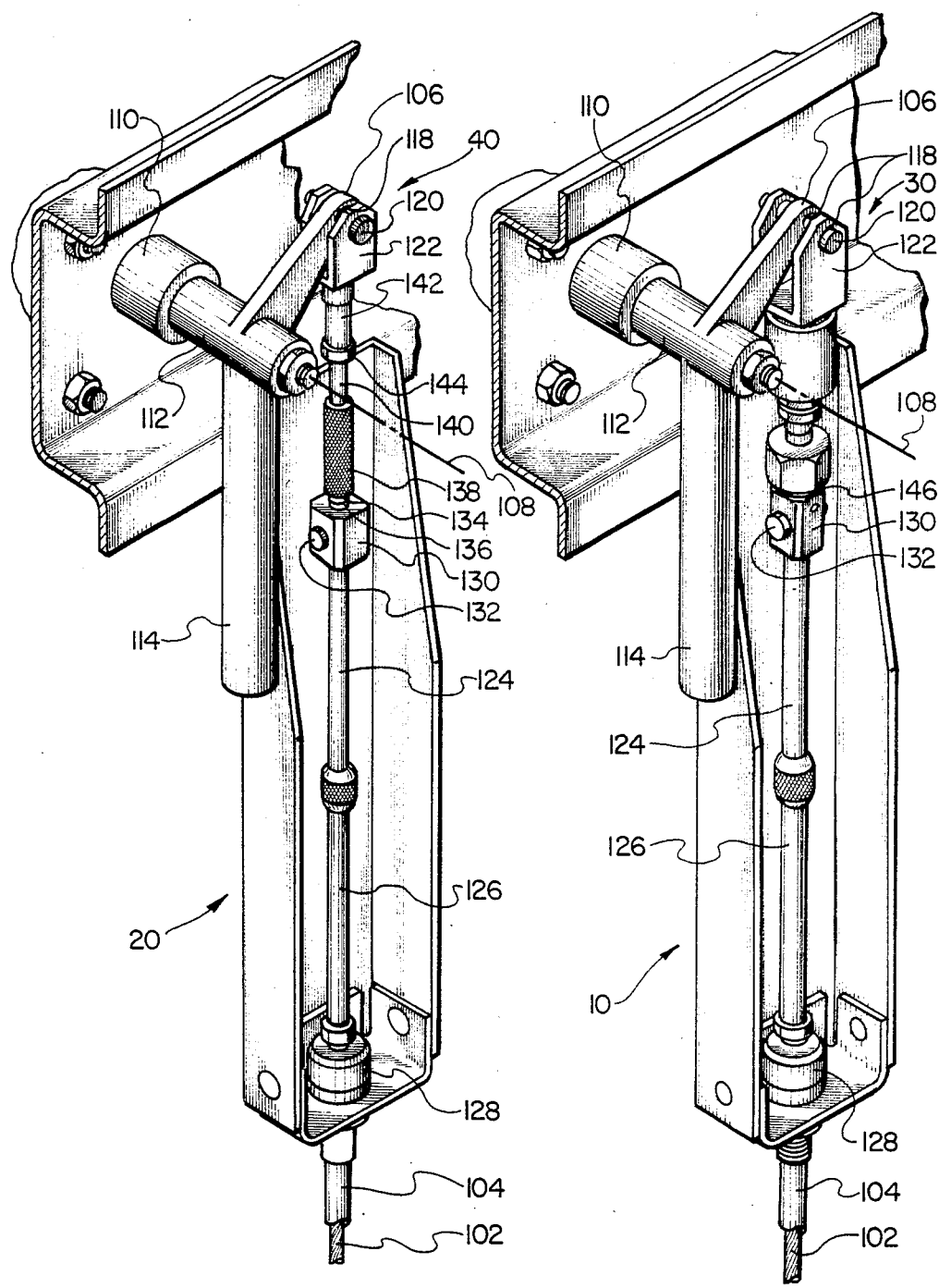
FIG. 1 is an isometric partially cutaway view showing how a push-pull cable of the prior art was connected to a control lever for a valve or other similar mechanism.
FIG. 2 is a partially cutaway isometric view similar to FIG. 1, but showing a spring-loaded backlash compensating coupling effecting the connection in accordance with the present invention.

Referring now to the drawings and in particular to FIGS. 1 and 2 thereof, it will be seen that the preferred embodiment of the push-pull cable constructed in accordance with the present invention (10) is generally similar to the prior art push-pull cable (20), with the notable exception that a spring-loaded backlash compensating coupling (30) has replaced the simple disconnect fitting (40) of the prior art.

More specifically, both the prior art cable assembly (20) of FIG. 1 and the improved cable assembly (10) of FIG. 2 utilize a flexible cable (102) retained inside an outer sheath (104). Furthermore, the cable assembly is utilized to rotate a lever arm (106) about an operational axis (108) of a valve assembly, of which only the packing gland (110) is visible in the Drawings. The lever arm (106) is welded to or otherwise forms an integral part of the operating shaft (112) of the valve; an emergency operating handle (114) is also provided whereby the valve may be operated directly without resorting to a push-pull handle (116) that is at the other end of the push-pull cable (see FIG. 4). It will be seen that the valve operating lever arm (106) is provided with a bore (118) (see FIG. 5) parallel to the lever's rotational axis (108). A retaining pin (120) passing through this bore thus may pivotally connect the arm (106) with a fitting in the form of a clevis (122) at the upper end of the push-pull cable assembly (10). An actuating rod (124) telescopes within an extension (126) of the outer sheath (104) secured thereby by means of a swivel fitting (128) which accommodates the to and fro movement of the actuating rod (124) as the end of the lever arm (106) rotates in an arc about its rotational axis (108).

It will be noted that in both the prior art cable assembly (20) of FIG. 1 and the improved cable assembly (10) of FIG. 2, the actuating rod (124) is terminated at its upper end by an end fitting (130) through which passes a pinch bolt (132) which secures the upper end of flexible cable (102) to the actuating rod (124). However, the portion of the respective cable assemblies between the cable pinch bolt (132) and the clevis (122) are quite different from each other.

Referring specifically to the prior art configuration illustrated in FIG. 1, it will be seen the quick disconnect fitting (40) comprises a collet (134) for gripping an appropriately shaped extension (136) of the end fitting (130) and may be readily released therefrom by proper manipulation of a knurled sleeve (138). Extending above the sleeve (138) is a threaded rod (140) which may be adjusted in length relative to a downwardly descending internally threaded boss (142) depending from the clevis fitting (122). Once properly adjusted, these threaded parts are held in place relative to each other by means of a locknut (144).

Referring now specifically to the improved cable assembly of FIG. 2, it may be seen that the corresponding structure is a spring-loaded backlash compensating coupling (30) that is secured to a threaded extension (146) of the end fitting (130) and which is connected at its upper end to the clevis fitting (122) by a spring-loaded arrangement that will be described in more detail hereinafter with particular references to FIGS. 5 and 6.

Referring now to FIGS. 3 and 4, which it will be recalled are respectively an isometric partially cutaway view and an elevational side view of the fittings provided at either end of the push-pull cable outer sheath (104), it will be noted that the outer sheath (104) is rigidly mounted to a strengthening rib (148) of the aircraft in the vicinity of the swivel fitting (128) by means of a nut (150). Furthermore, a number of supporting clamps (152) also mounted to various structural members of the aircraft are provided along the length of the outer sheath (104) at appropriate intervals from the upper swivel fitting (134) to the lower handle (116). An intermediate coupling (154) is also provided to facilitate mounting and adjusting of the relatively rigid conduit forming the sheath (104), thereby enabling it to be adjusted and installed in conveniently sized sections.

The lower end of the outer sheath (104) is rigidly mounted to the rear of a maintenance panel (156) and partially protrudes therethrough as handle shaft bushing (158). The handle shaft (159) is of the same external dimensions as the flexible cable (102) and thus is free to slide into and out of the outer sheath (104) and the outer sheath handle bushing portion (158). The handle (116) is held in its fully pushed-in position by a keeper assembly (160) which, as best seen in FIG. 4, comprises a channel member (162) and a latch member (164). The channel member (162) is pivoted at one end to a supporting post (166) and at the other end is hingedly connected to the aforementioned latch member (164). The latch (164) co-acts with a pin (168) mounted to the same supporting structure that holds the post (166) but separated therefrom by a distance approximately equal to the length of the channel member (162). It will be seen that the latch member (164) is provided with a camming surface (170) and a detent surface (172) such that, as the latching member (164) is pressed upward, the camming portion (170) co-acts with the pin (168) to force the channel member (162) to push up on the handle (116) until the detent surface (172) catches on the pin (168) and the latch, the channel and the handle are then all held in their normal or fully pushed-in position. A resilient rubber pad (176) may be provided between the lower surface (174) of the handle and the upper surface (178) of the channel member to protect the handle from scuffing and to provide a certain resiliency to the latching action between the handle and its keeper. However, when a properly adjusted spring-loaded backlash compensating coupling (30) is provided in accordance with the present invention, the resilient pad (176) could be omitted and the push-pull cable assembly (10) would still function properly.

Figure 5:
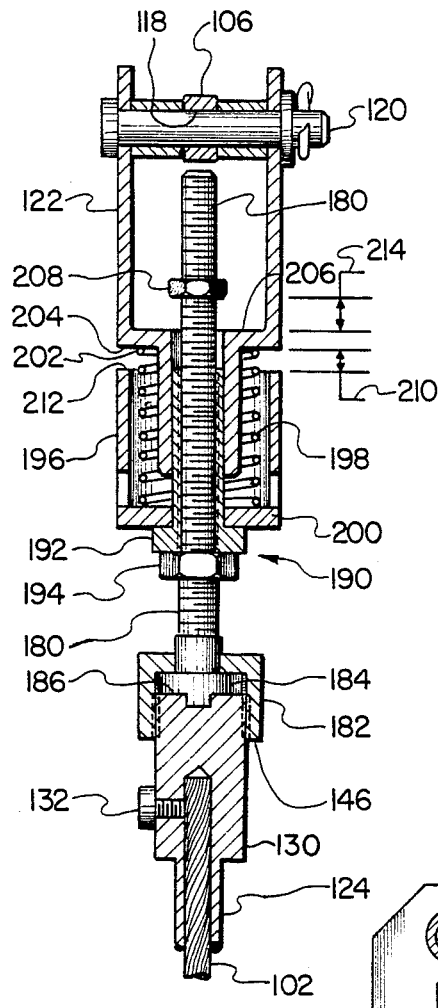
FIG. 5 is an enlarged cross-sectional view of the spring-loaded backlash compensating coupling and related fittings of the embodiment of FIGS. 2, 3, and 4 showing the coupling in its intermediate position.
Figure 6:
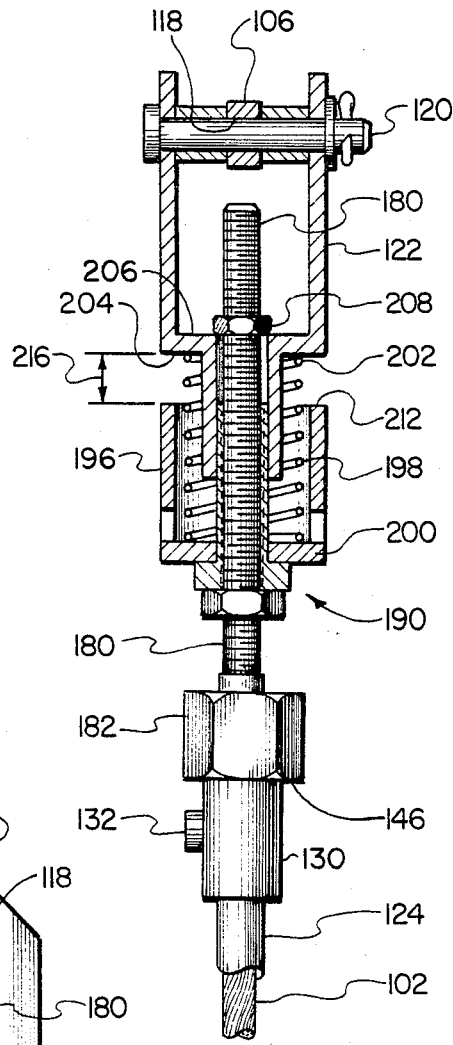
FIG. 6 is a cross-section view similar to FIG. 5 but showing the coupling in its extended position.

Referring now to FIGS. 5 and 6, which will be recalled are enlarged cross-sectional views of the spring-loaded backlash compensating coupling (30) and other related fittings utilized in the embodiment of FIGS. 2, 3 and 4, it should be noted that FIG. 5 shows the coupling in its "intermediate" position when the operating handle (116) at the other end of the push-pull cable (102) is secured in its fully pushed-in position by the keeper assembly (160) (as best seen in FIG. 4) and the coupling is exerting an upwards compressive force against the clevis fitting (122) and clevis pin (120) at its upper end and at its lower end is exerting a downwards compressive force against the actuating rod (124) through the end fitting (130).

Referring specifically to FIG. 5, it will be seen that the threaded rod (180) effectively functions as an upper extension to the actuating rod (124) since it is rigidly secured thereto by means of a flange nut (182) that secures a flange (184) at the lower end of the threaded rod (180) against the upper surface (186) of the end fitting threaded portion (146) provided at the upper end of the actuating rod (124). A locknut assembly (190) comprising an internally threaded bushing (192) and a lower locknut (194) is provided towards the lower end of the threaded rod (180) to adjust the position of a spring retaining cup (196) relative to the longitudinal dimension of the threaded rod (180). A compression spring (198) is retained inside the spring retaining cup (196) and is aligned co-axially with respect to the longitudinal axis of the threaded rod (180) such that its lower end presses downwardly via the base (200) of the spring retaining cup (196) and the locknut assembly (190) to act on the threaded rod (180) and thence via the flange (184) and the upper surface (186) of the threaded portion (146) to exert a downward compressive force onto the actuating rod (124) and the rest of the cable assembly (10).

The upper end (202) of the compression spring (198) presses against a lower horizontal surface (204) of the clevis fitting (122) and accordingly tends to press the clevis fitting together with the lever arm (106) pivotally mounted thereto in an upward direction until a horizontal inner surface (206) of the clevis fitting (122) comes into contact with a second adjustable locknut arrangement (208).

Since the valve being controlled by the push-pull cable (20) is provided with an internal stop at its "normal" (for example, closed) position, it is possible to adjust the lower locknut assembly (190) and the upper locknut arrangement (208) relative to the threaded rod (180) such that when the operating handle (116) is in its fully pushed-in position and the valve operating lever (106) is at the upper limits of the arc through which it rotates, the compression spring (198) will not be fully compressed, but will rather assume an intermediate position wherein a measurable gap (210) will be visible between the lower surface (204) of the clevis (122) and the upper edge (212) of the spring retaining cup (196) when the keeper assembly (160) is in its latched position. In one exemplary embodiment, it has been found convenient to make this gap approximately 0.12 inches (3.0 millimeters). This clearance may be conveniently achieved by latching the handle (116) in its fully pushed-in position by means of the keeper assembly latch member (164) and then rotating the adjustable bushing (192) until the proper clearance has been established, whereupon the lower locknut (194) may be tightened against the bushing (192) to prevent the assembly from coming out of adjustment due to vibration, etc. The clearance provided by this adjustment establishes the proper pre-load on the compression spring (198) when the valve is in its normal position and the push-pull cable handle (116) is held in its fully pushed-in position by the keeper assembly (160). Accordingly, this initial pre-load force will serve both to retaining the valve in its normal position and to retain the push-pull cable handle (116) against the keeper channel member (162) and pre-load the detent portion (172) of the latch against its latch pin (168). A cushioning effect is also provided between the push-pull cable assembly (10) and the valve, even if the handle (116) is subject to extreme forces.

The upper locknut (208) is adjusted to provide an over-travel clearance (214) that effectively determines how much backlash wear can be accommodated in the cable assembly (10) before re-adjustment becomes necessary. However, it is preferable not to provide excessive over-travel clearance (214) upon initial assembly since this will result in additional lost motion.

FIG. 6 shows the components of FIG. 5 in their fully "extended" position which they will assume after the handle (116) has been released from its fully pushed-in position by unlatching the keeper assembly (160). It will be noted that upper locknut (208) now is in contact with the clevis' internal surface (206), thus a downward force on the threaded rod (180) will be exerted via the locknut (208). A corresponding downward force on the clevis (122) then is transferred to the valve lever arm (106) through the pivoting action of the clevis pin (120). It will be noted in particular that once the compression spring (198) is in its fully extended (216) position (limited only by the position of the over-travel locknut (208) relative to the threaded rod (180)), compressive forces from the handle (116) are transmitted directly to the clevis (122) and vice versa via the compression spring (198). It should be noted that, even when it is in its extended position, as shown in FIG. 6, the compression spring (198) is still pre-loaded so as to exert a compressive force greater than the actuating forces required to operate the valve mechanism and thus functions to effect a relatively solid connection between the valve mechanism and the operating handle (116), even when only compressive forces are involved. Conversely, tensile forces from the operating handle (116) to the clevis (122) are transmitted directly by the over-travel locknut (208). In either case, no additional operating or frictional forces are involved, compared to a solid mechanical connection between the clevis (122) and the actuating rod (124).

Figure 7:
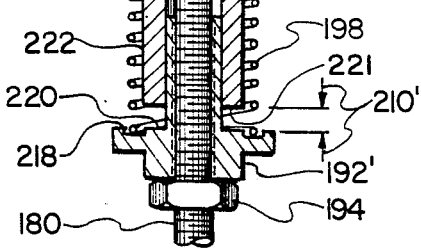
FIG. 7 is a cross-section view of a second embodiment of a spring-loaded backlash compensating coupling for a push-pull cable.

FIG. 7, it will be recalled, is a cross-section view of a second embodiment of a spring-loaded backlash compensating coupling (30) for a push-pull cable (10). Referring now specifically to this Figure, in which components or elements similar to but somewhat modified from their counterparts in the above-described presently preferred embodiment have been identified with the same reference numerals but followed by the "prime" symbol ("'"), it will be noted that the clevis (122') is also provided with an internally threaded adjusting bushing (192') held at the appropriate position on the threaded rod (180). However, the compression spring (198) exerts its compressive force not on the spring cup (200) as shown in FIGS. 5 and 6, but rather upon an annular recess (218) provided in a horizontal surface (220) of the bushing (192'). Furthermore, the modified clevis fitting (122') has an elongated downwardly depending bushing portion (222) which functions both as a gauge for adjusting the position of the bushing (192') and to maintain the compression spring (198) in its proper concentric position about the threaded rod (180). Thus, in this embodiment it will be seen that the functions of the internally threaded sleeve bushing (192') and of the clevis (122') have been somewhat modified so that a separate spring retaining cup (196) as shown in FIG. 5 is no longer required.

In the case of this alternative embodiment, the normal pre-load force exerted by the compression spring (198) against the lever arm (106) can be adjusted by reference to the measurable gap (210') between the lower end (221) of the bushing portion or boss (222) extending down from the clevis (122') and the upper surface (220) of the modified bushing (192') when the handle (116) is held in it fully pushed-in position by the keeper assembly (160) and the compression spring (198) is thereby compressed and exerting force against the lever arm (106) to hold the valve in its normal position.

It is apparent that there has been provided with this invention a novel Spring-Loaded Push-Pull Cable Assembly which fully satisfies the objects, means and advantages as set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. In a push-pull mechanism for moving a lever arm on a control device from a normal position established by an integrally provided stop to an alternative position, said push-pull mechanism comprising a flexible inner cable, an operating handle operatively connected at one end of said cable, an actuating rod having first and second ends, said first end operatively connected at a second end of said cable, and an outer sheath for restricting any spiraling or undulating tendencies in said inner cable so that said actuating rod will be caused to move a predetermined distance in a first longitudinal direction in response to said handle being moved by a distance equal to said predetermined distance plus a backlash distance from a pushed-in to a pulled-out position and to move in all opposite longitudinal direction when said handle is moved from said pulled-out position to said pushed-in position, the improvement comprising:

a spring-loaded backlash compensating coupling operatively connecting said actuating rod with said lever, said spring-loaded coupling being provided with a first adjusting means for determining an effective distance between said lever and said operating handle when said handle is in its pulled-out position and with a second adjusting means for determining a pre-load compressive force exerted by said coupling against said lever when said handle is at a fully pushed-in position.

2. The improved push-pull mechanism of claim 1, wherein said coupling comprises a threaded adjusting rod having first and second ends, means for pivotally connecting said cable to said lever, and a compression spring for exerting a compressive force between said pivoting means and said threaded rod.

3. The improved push-pull mechanism of claim 2, wherein said threaded adjusting rod is provided with a flange at its first end removably coupled against the second end of said actuating rod.

4. The improved cable mechanism of claim 3, wherein said first adjusting means is a locknut provided at the second end of said threaded actuating rod remote from said flange.

5. The improved cable mechanism of claim 2, wherein said means for pivotally connecting is a clevis fitting having first and second ends, said first end connected to said lever by a clevis pin and said second adjusting means comprises an internally threaded bushing slideably positioned inside a boss provided at the second end of said clevis fitting remote from said lever arm.

* * * * *